March 5, 1968  J. BILLARANT  3,372,080
MACHINE FOR THE MANUFACTURE OF FLEXIBLE BANDS
FITTED WITH HOOKED ELEMENTS
Filed Nov. 23, 1964  4 Sheets-Sheet 4
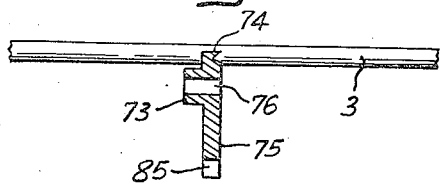
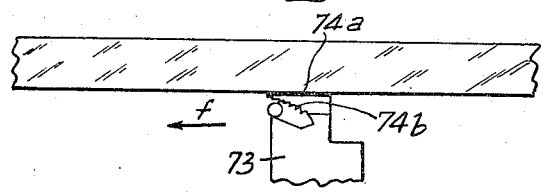
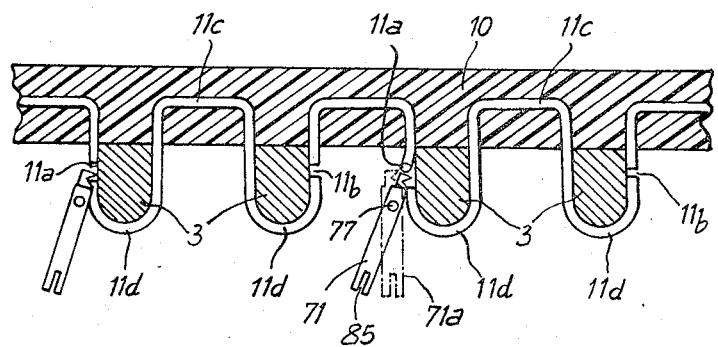
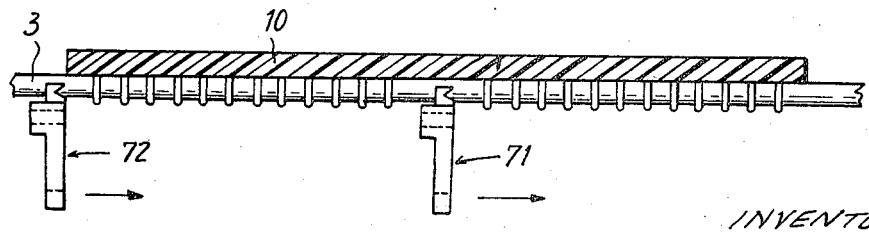
INVENTOR
JEAN BILLARANT
By
OSTROLENK, FABER, GERB & SOFFEN
ATTORNEYS 3,372,080
MACHINE FOR THE MANUFACTURE OF
FLEXIBLE BANDS FITTED WITH HOOKED
ELEMENTS
Jean Billarant, 2 Ave. Odette, Nogent-sur-Marne,
Seine, France
Filed Nov. 23, 1964, Ser. No. 412,899
Claims priority, application France, Nov. 29, 1963,
955,515
13 Claims. (Cl. 156—435)

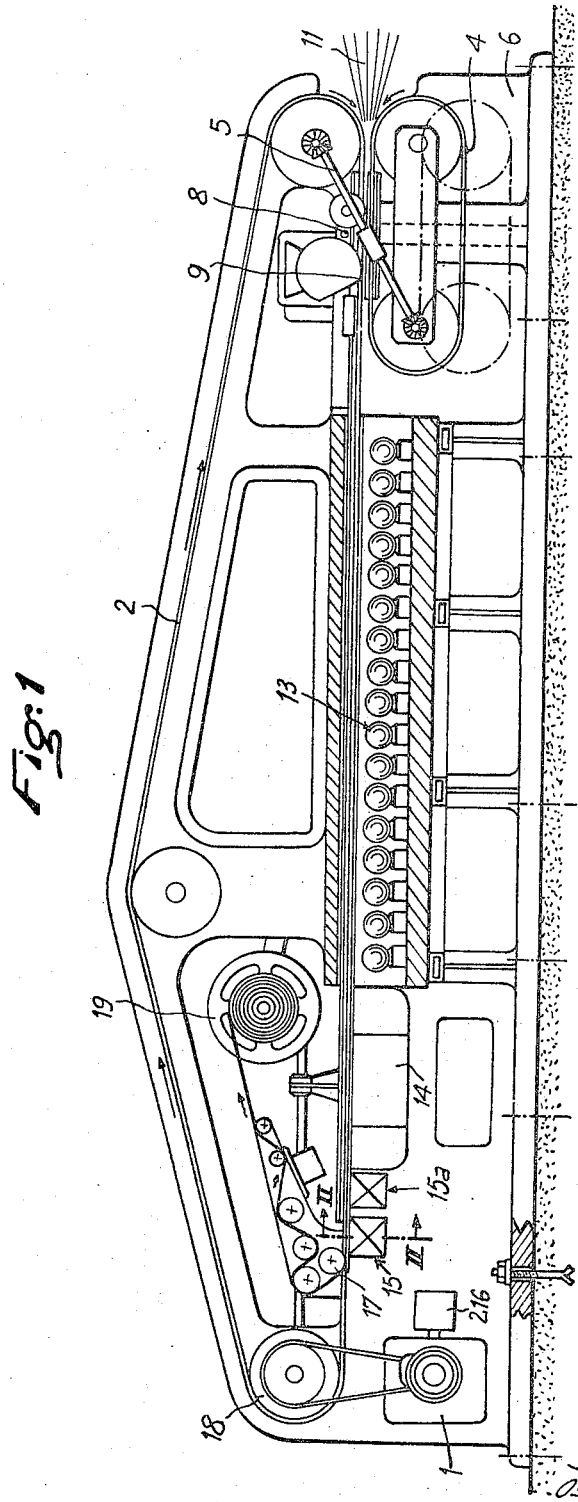

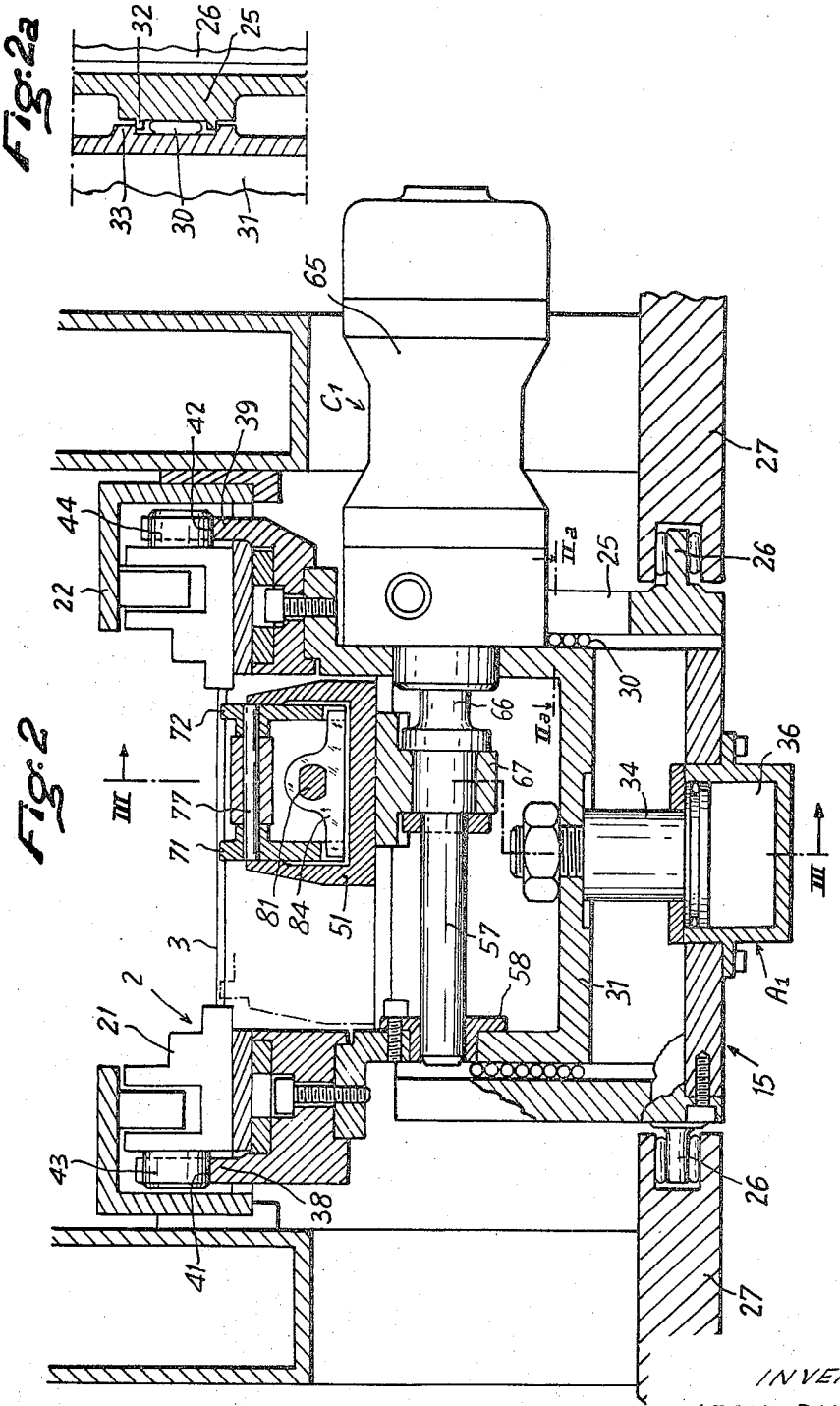

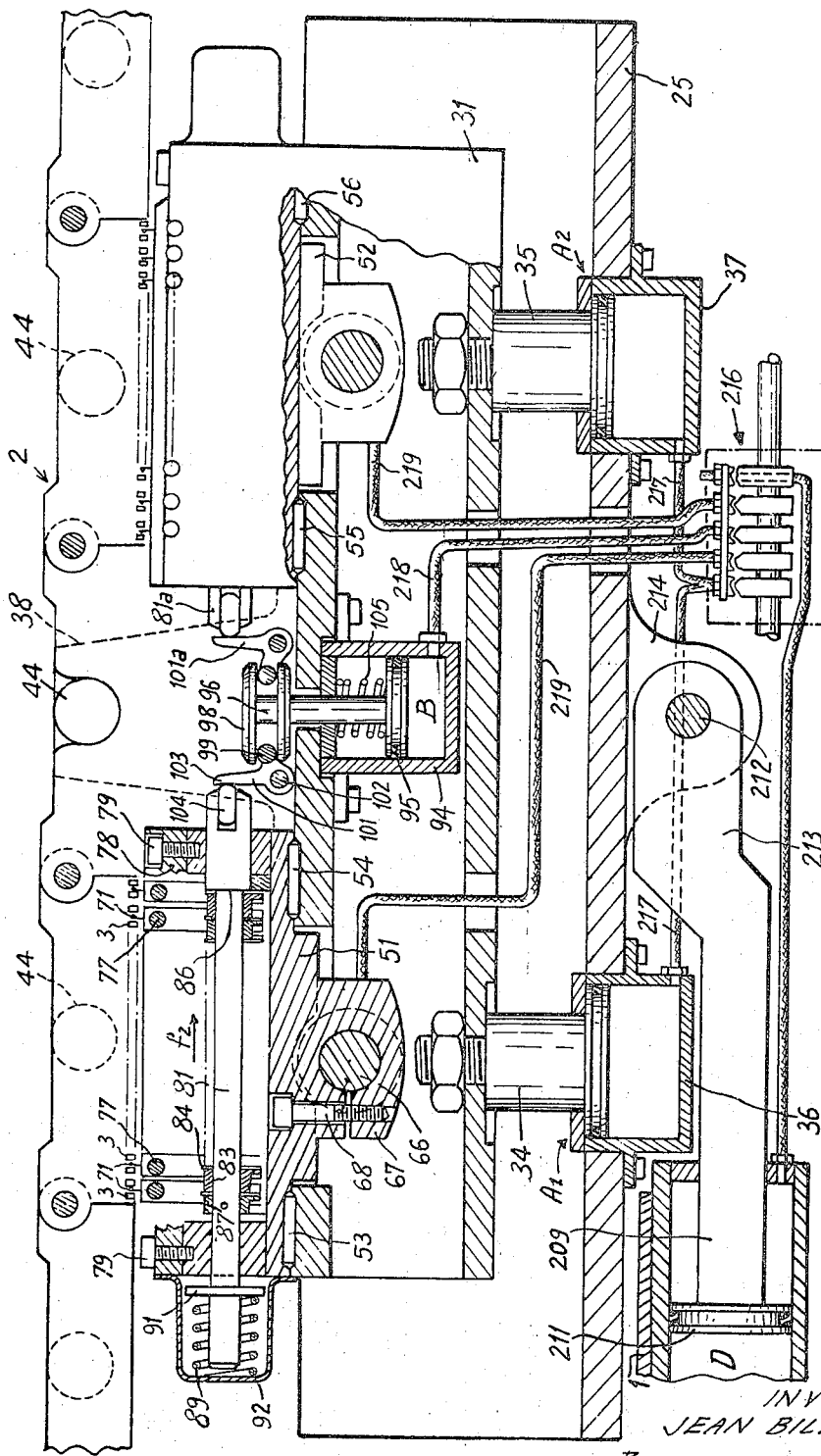

ABSTRACT OF THE DISCLOSURE

A machine for cutting loop-shaped elements, embedded in a sheet of plastic material, into hook-shaped elements.

This invention relates to machines for the continuous manufacture of flexible bands fitted with hooked elements of the filament type, comprising means for guiding a layer of parallel threads of thermo-plastic material between two chains of bars which interengage temporarily for the purpose of waving the threads whilst a plate of flexible plastic material is laid down on one face of the layer which has thus been waved, and means for cutting the loops which have been embedded in the flexible plate of plastic material so as to convert said loops into hooks.

The invention is directed more especially to the means for cutting the loops of threads in the form of an automatic device.

In accordance with the main characteristic feature of the invention, the device referred-to comprises a first frame adapted to move along a path paralel to one portion of the chain of bars which carry the loops of threads inserted in the plate of plastic material, a second frame carried by and movable on said first frame in such a manner as to be capable of moving towards and away from the chain, cutters carried by a carriage which is movable on the second frame in a direction parallel to the bars of the chain in such a manner as to ensure that, on the one hand, when the second frame is moved away from the chain, the cutters are moved away from the bars whereas, when said second frame is moved towards said chain, the cutters are applied against the bars and to ensure that, on the other hand, when the cutter carriage is located at the ends of its travel, the cutters are applied against a portion of the bars which is not covered with loops of threads, and means for temporarily securing the first frame to the chain, for returning said frame to the initial position thereof, for displacing the second frame on the first, and for displacing the cutter carriage on the second frame.

The invention also has for its object forms of embodiment comprising at least one of the following characteristic features:

(a) The chain being made up of links pivotally attached to each other and each carrying a predetermined number of bars, the carriage is provided with the same number of cutters which are intended to cut the loops of threads carried by the corresponding bars and the means for temporarily securing the first frame to the chain and for returning said fame to the initial position thereof are so designed and arranged that one complete cutting cycle takes place each time the chain has moved forward by a distance which is a multiple of the length of a link.

(b) The means for temporarily securing the first frame to the chain consist of a tongue which is carried by one of these two units and which is engageable in a slot associated with the other unit.

(c) Each link of the chain is provided with a tongue and the corresponding slot is cut in a cheek which forms part of the second frame, the travel of the means for producing the back movement of the first frame being equal to the length of one link of the chain.

(d) The first frame is slidably mounted in slideways of the frame of the machine which are parallel to the portion considered of the chain.

(e) Each of the cutters is supported by the carriage by means of a pin which is parallel to the direction of the bars and is returned elastically in the direction in which said cutter is moved away from the corresponding bar, whilst means for the application of force cause said cutter to pivot elastically in the direction which applies said cutter against said bar.

(f) The cutters are connected through the intermediary of a spring to a rod which slides within the carriage in a direction at right angles to the direction of displacement of said carriage on the second frame and which is subjected to the action of a cam which is movable on said second frame.

(g) At least one of the means for temporarily securing the first frame to the chain, for returning said frame to its initial position, for displacing the second frame on the first and for displacing the cutter carriage on the second frame consist of jacks driven by a fluid under pressure, said jacks being controlled by a distributor and actuated in synchronism with the chain.

(h) The cutter carriage is divided into two sections which are placed in such a manner as to be located opposite two different links of the chain, the cutters of one of said sections being so disposed as to cut those loops to be transformed into hooks which are oriented in one direction, whilst the cutters of the other section are disposed in such a manner as to cut those loops to be transformed into hooks which are oriented in the other direction.

(i) Each cutter comprises a blade having a triangular pyramidal shape, one face of which is applied flat against the corresponding bar whilst the opposite edge thereof is sharp and constitutes the cutting edge for cutting the threads, the point of the blade being directed foremost relatively to the direction of forward motion of the carriage during the cutting operation.

(j) When the product has a central zone without loops of threads, a first cutter is initially placed at the edge of the product and a second cutter is placed in the aforesaid central zone, the travel of the cutters being then substantially equal to one half only of the width of the product.

(k) The machine is provided with two cutting devices which are placed one after the other on the path of the aforesaid portion of chain in order to ensure that, while either one of the two cutting devices is in service, the other can be put out of service or removed for grinding or maintenance.

(l) A plurality of cutting devices which are placed one after another in succession on the path of the aforesaid portion of chain are actuated simultaneously.

The invention will be more clearly understood from a persual of the following description and from a study of the accompanying drawings which show by way of non-limitative example one form of embodiment of a machine for the manufacture of flexible bands provided with hooked elements and equipped with a cutting device in accordance with the invention.

In these drawings:

FIG. 1 represents the complete machine as shown diagrammatically in profile.

FIG. 2 is a cross-section taken along the line II—II of FIG. 1 showing the machine on a larger scale.

FIG. 2a shows a detail in cross-section taken along the line IIa—IIa of FIG. 2.

FIG. 3 is a cross-section taken along the line III—III of FIG. 2.

FIG. 4 is a view on an even larger scale of a cutter as shown in FIG. 2.

FIG. 5 is a plan view which corresponds to FIG. 4, on a larger scale.

FIG. 6 is a profile view corresponding to FIG. 4 and showing the work performed by the cutters.

FIG. 7 shows on a larger scale the work preformed by the cutters over the entire width of the product as can be seen in the top portion of FIG. 2.

A detail description will not be given in connection with the machine for the manufacture of the flexible band provided with looped elements which are intended to be cut so as to form hooks since this machine does not form part of the invention. Only the device for cutting said loops will therefore be dwelt upon in the following description.

It will simply be recalled that the threads 11 (as shown in FIG. 1) which are of a plastic material such as nylon are stretched between the end of the band of product during manufacture and the tension regulators of a creel (which has not been illustrated in the drawings); an electric motor 1 drives a top chain 2 (as also shown in FIG. 2) of forming bars 3 as well as a bottom chain 4 of counter-bars through the intermediary of a drive system which comprises an oblique shaft 5.

The counter-bars are subjected to a succession of vertical displacements as they pass through the machine, the top faces thereof lift the layer of threads, each counter-bar being adapted to move upwards alone in its turn between two forming bars. As a result of this movement, said counter-bar inserts each thread between two forming bars and, in so doing, causes the thread to form two loops 11d (as shown in FIG. 6), the length of thread drawn as a result of this movement being substantially equal to twice the depth of the loop.

The loops of threads are subjected to the radiant heat of an electric resistance-type heater element 8 (as shown in FIG. 1), with the result that said loops are freed from any internal tension which may have been induced therein and are already subjected to a preliminary shaping of the top portions 11c thereof which will then be embedded in the plate 10 of plastic material.

An extrusion head 9 (as shown in FIG. 1) deposits on the continuous surface which is formed by the top faces of the bars and of the counter-bars a layer of plastic material which forms a band or plate 10 (as also shown in FIGS. 6 and 7) and completely covers the loops of threads 11c which are lifted by the counterbars.

As the simultaneous progression of the chains of bars and counter-bars takes place, further loops of threads are formed and covered by the band of plastic material which is continuously deposited on the bars.

The product is therefore presented in the form of a band of plastic material in which are anchored the tops of all of the loops of threads 11c located on the top face of the wavy layer of threads (as shown in FIGS. 6 and 7).

The counter-bars withdraw freely from the product in a downward direction, whereupon the product which is formed on the chain of bars continues to advance into a furnace 13 in which the filaments of thermo-plastic material are formed. The product is then cooled in a zone which is designated by the reference 14 and reaches the loop-cutting device 15.

The product is then passed over a roll 17 whilst the chain 2 of bars continues along its horizontal rectilinear path up to the drum 18, the hooked threads open so as to withdraw from the bars and revert to their initial shape under the action of their natural elasticity. The finished product, after inspection, is wound on a storage reel 19.

There will now be described in detail the cutting device 15 which transforms the loops into hooks.

There are again shown in the large-scale transverse sectional view of FIG. 2 the forming bars 3 which are embedded in the links 21 forming the top chain 2 which is displaceable in guides 22 rigidly fixed to two longitudinal members 27 of the frame 6 of the machine, The cutting device which is generally designated by the reference 15 comprises an outer frame 25 provided with two external tongues 26 which are adapted to slide, preferably through the intermediary of rows of needle bearings, within two corresponding guide tracks of the two longitudinal members 27.

There is adapted to slide vertically in the outer frame 25 an inner frame 31 (as also shown in FIG. 3) which is guided by slideways 32, 33 (as shown in FIG. 2a) which form part respectively of said two frames and which are fitted with rows of roller-bearings 30. The inner frame 31 is supported by the plungers 34, 35 of two single-acting jacks A1, A2 which are operated by compressed air (or by any other driving fluid) and the cylinders 36, 37 of which are integral with the outer frame 25.

The inner frame 31 has a downward extension in the form of two checks 38, 39, the upper extremities of which are provided with enlarged recesses 41, 42 for the purpose of engaging over positioning rollers 43, 44 mounted on the lateral faces of each link 21 at the mid-length of this latter.

The inner frame 31 is represented in the top position thereof in which the recesses 41, 42 are engaged over the positioning rollers of one link. When the frame 31 moves down to the bottom position thereof in which the jack plungers 34, 35 are lowered so as to come against the bases of the corresponding cylinders 36, 37, the top edges of the cheeks 38, 39 which are integral with the inner frame 31 are located at a level below that of the rollers 43, 44, with the result that said rollers can move freely with the top chain 2 without drawing the frame 31 in this movement.

The combined assembly of the cutting device 15 is double and substantially symmetrical with respect to a plane at right angles to the direction of the chain 2 of forming bars and which passes through the mid-length of said assembly.

Two carriages 51, 52 are adapted to slide within the top portion of the inner frame 31, for example through the intermediary of rows of needle-bearings 53, 54, 55, 56 respectively.

The sliding motion of these two carriages is carried out by two double-acting compressed-air jacks preferably with damping systems, such as the jack C1 (as shown in FIG. 2), the cylinder 65 of which is integral with the inner frame 31 whilst the plunger-rod 66 thereof is clamped within a collar 67 (as shown in FIGS. 2 and 3) which is fitted with a clamping screw 68. The plunger-rod 66 is provided with an extension 57 which is guided within a bushing 58 secured to the frame 31.

Each of the two carriages 51, 52 is fitted with an even number of cutters 71, 72 which is equal to one-half the number of bars 3 mounted in each link 21 of the top chain 2.

When the carriage 51 takes up the position which is illustrated in FIG. 2, the cutters such as the cutter 71 of all of the pairs of cutters are located at the center of the band 10 of product (as also shown in FIG. 7), that is to say opposite a location in which no loops of threads are formed, and the other cutter 72 is located opposite one edge of the band, that is to say also opposite a location which is devoid of thread loops.

Each cutter such as the cutters 71 or 72 is made up of a body 73 (as shown in FIGS. 4 to 6) having a generally flattened shape which is fitted at the top with a cutting blade 74 and at the bottom with a tailpiece 75. There is formed in the body 73 a bore 76 through which is inserted a horizontal rod 77 (see also FIGS. 2 and 3). All of the rods such as the rod 77 for the articulation of the cutters are carried by a plate 78 (as shown in FIG. 3) which is secured by means of screws 79 to the top of the carriage 51.

Each cutter such as the cutter 71 can take up either a vertical inactive position as shown in FIG. 6 in chain-dotted lines at 71a, or an inclined position as shown in full lines at 71. In this last position, one face 74a (FIG. 5) of the cutting blade 74 is applied against the corresponding face of a forming bar 3; and a cutting edge 74b, which is preferably crimped and which is inclined with respect to the face 74a so as to make an acute angle with this latter, can readily be inserted between said face of the bar 3 and the loop of thread 11d when the blade moves in the direction of the arrow f1 (as shown in FIG. 5). In other words, the active end portion of each cutter has a very acute triangular pyramidal shape and, for the purpose of carrying out a cutting operation, moves with the point foremost, one face 74a thereof being applied flat against a bar, the cutting edge thereof being that edge which is opposite to said face.

All the cutters of one carriage can be caused to move simultaneously from their neutral vertical positions to their inclined working positions by means of a device which comprises a rod 81 (as shown in FIG. 3) which is adapted to slide within the carriage 51 in a direction parallel to the general direction of the chain 2 and on which are alternately fitted spacer rings 83 and flat blade springs 84 (also shown in FIG. 2) which are suitably cut out and the two extremities of which are inserted respectively in slots 85 (FIGS. 4 and 6) formed in the tailpieces 75 of the cuters of a same pair. The assembly of washers and springs on the rod 81 is applied at one extremity against an annular shoulder 86 of said rod whilst the other extremity is applied against a ring 87 secured to said rod by means of a locking-pin.

The rod 81 is urged in the direction in which all the cutters are returned to the vertical inactive positions thereof by a spring 89, one end of which is applied against an annular flange 91 of said rod and the other end of which is applied against the bottom of an end-cap 92 which is secured to the inner frame 31'.

The rod is driven in the other direction, that is to say in the direction in which the cutting blades are applied against the forming bars, by means of another compressed-air jack B (shown in FIG. 3), the cylinder 94 of which is integral with the inner frame 31 and the plunger rod 96 of which carries two plates 97, 98 between which is held a roller 99 mounted on a two-arm lever 101. The summit of said lever is pivoted on a pin 102 carried by said frame 31 whilst the other arm 103 of said lever forms a rule in a direction parallel to the direction of displacement of the carriage 51 and against which the corresponding extremity of the rod 81, fitted with a roller 104, is applied by the return spring 89. The jack B is of the single-acting type and the plunger 95 thereof is urged downwards by a spring 105.

The carriage 52 is equipped in a similar manner and its cutters especially are inclined under the action of a sliding rod 81a which is identical with the rod 81 and which is actuated by the same jack B through the intermediary of a drive system which comprises another ascillating lever 101a.

The operation involving the cutting of the loops of threads is carried out while the cutting device 15 as a whole is coupled to the chain of links by means of the cheeks 38, 39 and lasts a shorter period of time than the time taken by the chain to cover the distance which corresponds to the length one link. The return movement of said cutting device takes place after the downward movement of said cheeks under the action of fourth compressed-air jack D (as shown in FIG. 3). The cylinder 208 of said jack D is secured to the frame 6 of the machine, whilst the rod 209 of its plunger 211 is coupled to the outer frame 25 by means of a pin 212 which passes through a lug 213 forming part of the plunger rod 209 and through a yoke 214 which in integral with the bottom face of said frame.

All the jacks, namely the two jacks A1 and A2 which serve to lift the inner frame, the jack B for controlling the application of the cutting blades against the bars, the two jacks C1, C2 for actuating the two carriages 51, 52 for the cutting motion, and the jack D for returning the cutting assembly are supplied from any suitable compressed-air source by means of a distributor of any suitable type and conventional design which is generally designated by the reference 216 (in FIGS. 1 and 3) and which is driven in strict synchronism with the movement of the chain 2 from the reduction-gear motor 1 for driving said chain. There has been shown at 217, 218, 219 and 220 the pipes for the admission of driving fluid to the corresponding jacks.

All the cutters which are mounted on the carriages 51 and which are inclined toward the right hand side when looking at FIG. 3 are intended to cut the lops of threads 11d at the places indicated at 11a in FIG. 6, that is to say on the rear faces of the forming bars 10 considered in the direction of forward motion of the chain whilst the cutters which are mounted on the other carriages 52 serve to cut the loops of threads at those places which are designated by the reference numerals 11b in FIG. 6 against the front face of said bars.

The operation of the device is as follows:

While the chain advances with the product which is fitted with the loops of threads on the forming bars 3, the distributor 216 initiates the supply to the two jacks A1 and A2 in such a manner as to cause the inner frame 31 to move upwards exactly at the moment when the upper recesses of its cheeks 38, 39 appear in front of the positioning rollers 43, 44 of one of the links of the chain.

Thereupon, the complete cutting unit which is supported by the outer frame 25 is carried along by the chain with which it is temporarily made integral. All the cutters have moved into the vertical position within the spaces between the forming bars.

Immediately afterwards, the distributor 216 effects the supply of driving fluid to the jack B, the plunger of which moves upwards and, through the intermediary of the elbowed levers 101, 101a and sliding rods 81, 81a simultaneously initiates the application of the cutting blades of all the cutters against the corresponding forming bars, against those portions of these latter which are not covered with loops of threads.

The distributor 216 then initiates the supply of driving fluid to the two jacks C1 and C2 which accordingly produce the displacement of the two carriages 51, 52 within the inner carriage 31 in such manner as to cause the cutting blades to slide along the forming bars. Each cutter therefore cuts all of the thread loops which are located on the corresponding bar along one half of the length of this latter since two cutters work simultaneously, one behind the other, against each bar.

The distributor then effects the supply of driving fluid to the two double-acting jacks C1 and C2 in the opposite direction so as to effect the return of those cutters which rub under no load against the forming bars.

The distributor then carries out the discharge of air under pressure from the jack B in such a manner as to permit the return of the cutters to the neutral vertical position under the action of the return springs 89 and 105.

Finally, the distributor 216 carries out the evacuation of the two lifting jacks A1 and A2, with the result that the entire moving system carried by the inner frame 31 returns downwards under the action of its own weight and the cutting blades are withdrawn from the spaces between the bars whilst the cheeks 38 and 39 are disengaged from the rollers 43, 44 which serve to position said inner frame on the chain.

The entire cutting device is brought back to the initial position by means of the jack B which is supplied at this moment by the distributor 216 and is ready for a new cycle which will begin with the upward movement of the assembly under the action of the jacks A1, A2.

One complete cycle therefore lasts exactly the time taken by the chain to move over a distance corresponding to the length of one link. The complete time cycle comprises a portion during which the assembly moves upwards prior to being coupled to the chain, a portion during which said assembly is coupled to the chain, a portion during which said assembly returns downwards, and finally a portion during which said assembly returns to its starting position. The upward movements, downward movements and movements of return to the initial position are practically instantaneous. There accordingly remains an ample margin for the time which is necessary for applying the cutters against the bars, for the sliding movement of the cutters along the bars for the purpose of carrying out the cutting operation, and for the back movement of the cutters during the only period of the cycle in which the cutting device is coupled to the chain.

During one cycle, the hooks which are oriented in one direction are cut on one of the links of the chain by the cutters of one of the carriages whereas, during the same cycle, the cutters of the other carriage cut those hooks which are oriented in the other direction on the loops of threads which are located on one link of the chain which is separated from the preceding by another link.

In other words, those hooks which have one predetermined orientation are cut on one link in one of the carriages during a given cycle; during the following cycle, the same link is located in the central portion of the device and is not subjected to the action of the cutters and, in the third cycle, it is those hooks which have an opposite orientation which are subjected to the cutting process in the other carriage. As each cycle takes place, all the loops of one link are cut either in one direction or in the other in each of the two carriages.

The cutting of loops is therefore performed in a fully automatic manner and at a rate which introduces no delay in the delivery of the product, inasmuch as the speed of the cutting cycle is determined by the rate of feed or forward motion of the chain of product being manufactured.

As appears from FIG. 1, there has been shown at 15a a loop-cutting unit which is identical with the unit 15 which has just been described in detail in the foregoing in such a manner that, while one of the cutting units is in operation, it is possible if so required to grind, recondition or maintain the cutters of the other unit, both units being located one after the other on the path of the chain.

It will be understood that the invention is not limited to the forms of embodiment which have been described and illustrated and which have been given by way of example and that a large number of modifications can be made therein without consequently departing from the scope of this invention.

It accordingly follows, for example, that it would be possible to make a number of cutting units work simultaneously, for example the two units 15 and 15a (FIG. 1) which would allow more time for each unit to perform its intended functions.

What I claim is:

1. In a machine for the continuous manufacture of flexible bands fitted with hooked elements of the filament type, comprising means for guiding a layer of parallel threads of thermo-plastic material between two chains of bars which interengage temporarily for the purpose of waving the threads whilst a plate of flexible plastic material is laid down on one face of the layer which has thus been waved, an automatic device for cutting the loops which have been embedded in the flexible plate of plastic material so as to convert said loops into hooks, said device comprising a first frame adapted to move along a path parallel to one portion of the chain of bars which carry the loops of threads embedded in the plate of plastic material, a second frame carried by and movable on said first frame in such a manner as to be capable of moving towards and away from the chain, cutters, a carriage which carries said cutters and is movable on said second frame in a direction parallel to the bars of the chain in such a manner as to ensure that, on the one hand, when said second frame is moved away from the chain, said cutters are moved away from the bars whereas, when said second frame is moved towards said chain, said cutters are applied against the bars and to ensure that, on the other hand, when said cutter carriage is located at the ends of its travel, said cutters are applied against a portion of the bars which is not covered with loops of threads, and means for temporarily securing said first frame to the chain, for returning said frame to the initial position thereof, for displacing said second frame on said first frame, and for displacing said cutter-carriage on said second frame.

2. Automatic loop-cutting device as claimed in claim 1, wherein the chain being made up of links pivotally attached to each other and each carrying a predetermined number of bars, said carriage is provided with the same number of cutters which are intended to cut the loops of threads carried by the corresponding bars and said means for temporarily securing said first frame to the chain and for returning said frame to the initial position thereof are so designed and arranged that one complete cutting cycle takes place each time the chain has moved forward by a distance which is a multiple of the length of a link.

3. Automatic loop-cutting device as claimed in claim 1, wherein said means for temporarily securing said first frame to the chain consist of a tongue which is carried by one of said members constituted by said first frame and said chain and which is engageable in a slot associated with the other of said members.

4. Automatic loop-cutting device as claimed in claim 3, wherein each link of the chain is provided with a tongue and the corresponding slot is cut in a cheek which forms part of said second frame, the travel of said first frame returning means being equal to the length of one link of the chain.

5. Automatic loop-cutting device as claimed in claim 1, wherein said first frame is slideably mounted in slideways of the frame of the machine which are parallel to the portion considered of the chain.

6. Automatic loop-cutting device as claimed in claim 1, wherein each of said cutters is supported by said carriage by means of a pin which is parallel to the direction of the bars, said device further comprising means adapted to return elastically said cutter in the direction in which said cutter is moved away from the corresponding bar, and force applying means for causing said cutter to pivot elastically in the direction which applies said cutter against said bar.

7. Automatic loop-cutting device as claimed in claim 1, wherein said cutters are connected through the intermediary of a spring to a rod which slides within said carriage in a direction at right angles to the direction of displacement of said carriage on said second frame and which is subjected to the action of a cam which is movable on said second frame for the purpose of applying pressure to said cutters automatically.

8. Automatic loop-cutting device as claimed in claim 1, wherein at least one of said means for temporarily securing said first frame to the chain, for returning said frame to its initial position, for displacing said second frame on said first frame and for displacing said cutter carriage on said second frame consist of pressure fluid jacks controlled by a distributor and actuated in synchronism with the chain.

9. Automatic loop-cutting device as claimed in claim 2, wherein said cutter carriage is divided into two sections which are placed in such a manner as to be located opposite two different links of the chain, the cutters of one of said sections being so disposed as to cut those loops to be transformed into hooks which are oriented in one direction, whilst the cutters of the other of said sections are disposed in such a manner as to cut those loops to be transformed into hooks which are oriented in the other direction.

10. Automatic loop-cutting device as claimed in claim 1, wherein each cutter comprises a blade having a triangular pyramidal shape with one face applied flat against the corresponding bar whilst the opposite edge thereof is sharp and constitutes the cutting edge for cutting the threads, the point of the blade being directed foremost relatively to the direction of forward motion of said carriage during the cutting operation.

11. Automatic loop-cutting device as claimed in claim 1, wherein, when the product has a central zone without loops of threads, a first cutter is initially placed at the edge of the product and a second cutter is placed in the aforesaid central zone, the travel of said cutters being then substantially equal to one half only of the width of the product.

12. Automatic loop-cutting device as claimed in claim 1, wherein the machine comprises two cutting devices placed one after the other on the path of the aforesaid portion of chain in order to ensure that, while either of the two cutting devices is in service, the other cutting device can be put out of service or removed for grinding or maintenance.

13. Automatic loop-cutting device as claimed in claim 1, wherein a plurality of cutting devices which are placed one after the other on the path of the aforesaid portion of chain are actuated simultaneously.

References Cited

UNITED STATES PATENTS

| | | | |
|---|---|---|---|
| 2,671,494 | 3/1954 | Coullette | 156—435 |
| 2,933,797 | 4/1960 | DeMestral | 26—9 |
| 3,009,235 | 11/1961 | DeMestral | 161—48 |
| 3,083,737 | 4/1963 | DeMestral | 139—46 |
| 3,130,111 | 4/1964 | Izumi | 161—48 |

EARL M. BERGERT, *Primary Examiner.*

D. J. FRITSCH, J. B. MELOCHE, *Assistant Examiners.*